United States Patent [19]

Myers

[11] Patent Number: 4,467,829
[45] Date of Patent: Aug. 28, 1984

[54] TURNING VANE RAIL

[76] Inventor: Jerome J. Myers, 7570 Mariner Dr., Maple Grove, Minn. 55369

[21] Appl. No.: 373,019

[22] Filed: Apr. 29, 1982

[51] Int. Cl.³ .............................................. B21D 39/00
[52] U.S. Cl. ................................ 137/561 A; 138/37; 138/39; 29/513
[58] Field of Search ...................... 29/513; 138/37, 39; 137/561 R, 561 A

[56] References Cited

U.S. PATENT DOCUMENTS

| | | | |
|---|---|---|---|
| 2,292,246 | 8/1942 | Steffens | 138/39 |
| 2,861,597 | 11/1958 | Gracer | 138/39 |
| 2,884,956 | 5/1959 | Perlin | 138/39 |
| 3,050,160 | 8/1962 | Chesser | 29/513 |
| 3,144,204 | 8/1964 | Bohanon | 29/513 |
| 3,224,668 | 12/1965 | Olmstead et al. | 29/513 |
| 3,350,124 | 10/1967 | Husted | 287/189.36 |
| 3,381,713 | 5/1968 | Jacobsen | 138/39 |
| 3,405,737 | 10/1968 | Harper | 138/39 |
| 3,511,525 | 5/1970 | Friedling et al. | 287/189.36 |
| 3,602,262 | 8/1971 | Hinden | 138/37 |
| 3,606,415 | 9/1971 | Friedling et al. | 287/189.35 |
| 3,812,817 | 5/1974 | Hallock, Jr. | 116/114 R |
| 3,837,136 | 9/1974 | Graham et al. | 52/760 |
| 3,918,826 | 11/1975 | Mez | 52/758 |
| 4,154,547 | 5/1979 | Mez | 403/403 |
| 4,297,049 | 10/1981 | Smitka | 403/403 |

Primary Examiner—A. Michael Chambers
Attorney, Agent, or Firm—Kinney & Lange

[57] ABSTRACT

A rail for mounting sheet metal turning vanes includes a sheet and integral vane guides extending generally perpendicular away from the plane of the sheet. Each vane guide is a plate slit from the sheet except for one edge along which the plate is bent. The plate is adapted for positioning adjacent to a wall of the vane. An access aperture, partially located in the sheet and partially located in the plate, is adapted to allow access to a portion of the vane wall for contact by a striking tool. A blow from the tool splits the sheet metal vane wall to form tabs which are folded through the aperture, which securely attach the wall to the rail.

2 Claims, 4 Drawing Figures

TURNING VANE RAIL

BACKGROUND OF THE INVENTION

1. Field of the Invention

This invention relates to apparatus for holding guide vanes such as air flow turning vanes in a duct.

2. Description of the Prior Art

Turning vanes are used to direct moving gases around duct corners where the ends of two ducts positioned at right angles intersect, such as heating or ventilation air ducts. If vanes are not used, air strikes the wall of the intersecting duct. This can cause turbulence or backflow in the duct. The vanes are positioned diagonally across the duct corner region to guide the air flow smoothly around the corner.

A commonly used turning vane is constructed by joining two pieces of curved sheet metal, having different radii of curvature, at their edges. This results in a hollow vane with a crescent-shaped cross section. The vane can be cut to whatever length is needed in a duct.

Although the vanes are easily constructed, the positioning and fastening of the vanes in an assembly which permits proper positioning in a duct is an expensive and labor-intensive process. Many techniques for fastening these vanes to a pair of sheet metal rails or to the ducts themselves have been tried. These techniques are not satisfactory because they involve using special fasteners or expensive tooling on the sheet metal.

A search of fasteners used in sheet metal attachment uncovered the following U.S. patents:

| Inventor | U.S. Pat. No. | Date of Issue |
|---|---|---|
| Husted | 3,350,124 | 10/31/67 |
| Friedling et al | 3,511,525 | 05/12/70 |
| Friedling et al | 3,606,415 | 09/20/71 |
| Hallock, Jr. | 3,812,817 | 05/28/74 |
| Graham et al | 3,837,136 | 09/24/74 |
| Mez | 3,919,826 | 11/18/75 |
| Mez | 4,154,547 | 05/15/79 |
| Smitka | 4,297,049 | 10/27/81 |

U.S. Pat. No. 3,350,124 to Husted discloses a method of curling an edge of a sheet into a closed loop and interlocking the loop with grooved parts.

U.S. Pat. No. 3,812,817 to Hallock, Jr. shows a hollow sheet metal nail designed for attachment in lightweight cement-based building materials. This fastener is not used to attach pieces of sheet metal.

U.S. Pat. No. 3,606,415 to Friedling et al discloses a connecting device for attaching two sheet metal plates at an angle. U.S. Pat. No. 3,511,525, also to Friedling et al, shows another connecting device for fastening sheet metal in perpendicular positions.

Two U.S. patents to Mez, U.S. Pat. No. 3,919,826 and U.S. Pat. No. 4,154,547, show connectors for joining two sheets of sheet metal in perpendicular fashion.

U.S. Pat. No. 4,297,049 to Smitka shows a fastener which is inserted through one sheet of metal in attachment to an edge of another sheet lying perpendicular to the first sheet.

None of these fastening techniques is suitable for use in holding turning vanes in that special fasteners are quite expensive in relation to the cost of the product. Attempts have been made to overcome this by tooling dimples into a rail. In this technique each dimple has a slot through which a sheet metal wall of the turning vane is exposed. The portion of the wall that extends into the dimple is cut in two and bent or crimped in two directions to hold the vane against the rail. This method required extensive labor.

The present invention fulfills the need for a rail for holding turning vanes which does not require special fasteners, which can be inexpensively produced, and which requires minimal labor for the attachment of turning vanes.

SUMMARY OF THE INVENTION

A rail for holding a vane has a base sheet and a vane guide plate integral with and extending generally perpendicular away from the plane of the base sheet. The vane guide plate is preferably formed from the base sheet by slitting all edges of the plate except one connecting edge and bending the plate out of the base sheet plane along the connecting edge, so that the connecting edge forms the bend line.

An access opening or aperture is punched out of the sheet and spans the bend line. Thus, when the plate is bent out of the plane of the base sheet the aperture is partially in the plate, forming a notch portion, and partially in the sheet. A wall of the vane to be supported by the rails is positioned adjacent to (preferably at least partially contiguous to) the plate and a portion of the vane wall which contacts the vane guide plate is aligned with the notch portion of the opening in the plate. This aligned portion of the vane wall is struck by a tool, such as a tinner's hammer, through the aperture portion in the sheet. A tab is partially broken away from the vane wall by the blow. The tab is bent through the notch portion in the plate to secure the vane to the vane guide plate and base sheet. In the preferred embodiment the member splits the aligned portion of the wall into two tabs.

In the preferred embodiment, a trapezoidal aperture is cut in the base sheet before the vane guide is formed. The trapezoidal aperture is positioned so that the longer side (the base end) of the two parallel sides of the trapezoid is cut in the sheet. The shorter of the two parallel sides (the top end) of the trapezoid is cut in the plate. Therefore, after the plate is slit and bent away from the sheet, the narrow end of the trapezoidal aperture is also bent down with the plate and the base line remains in the sheet.

The turning vanes are preferably hollow vanes of the type in which two pieces of curved sheet metal with different radii of curvature are attached at opposing edges to form a hollow vane having a crescent-shaped cross section. The vane guide plate is inserted in the lunular hollow formed by the curved walls of the vane. Edges of the plate contact the wall with the shorter radius of curvature and a portion of the plate contacts the wall of the longer radius of curvature. A portion of the wall with the long radius of curvature is accessible through the notch. This portion is struck by a hammer, as described above.

DETAILED DESCRIPTION OF THE PREFERRED EMBODIMENTS

Figure 1:
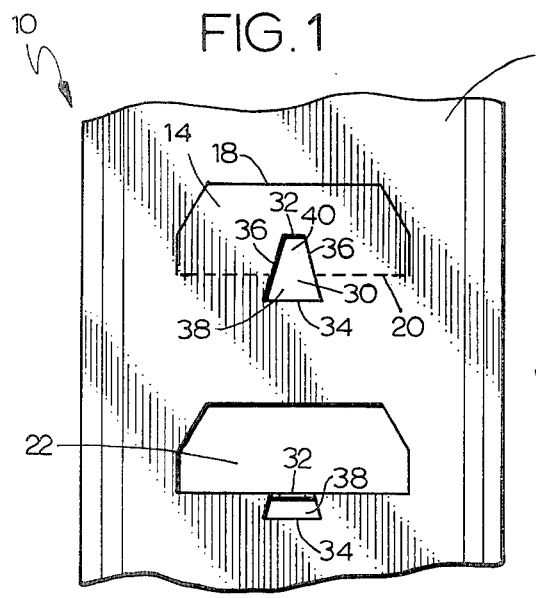
FIG. 1 is a top plan view of a portion of rail for holding turning vanes, constructed according to the present invention.
Figure 2:
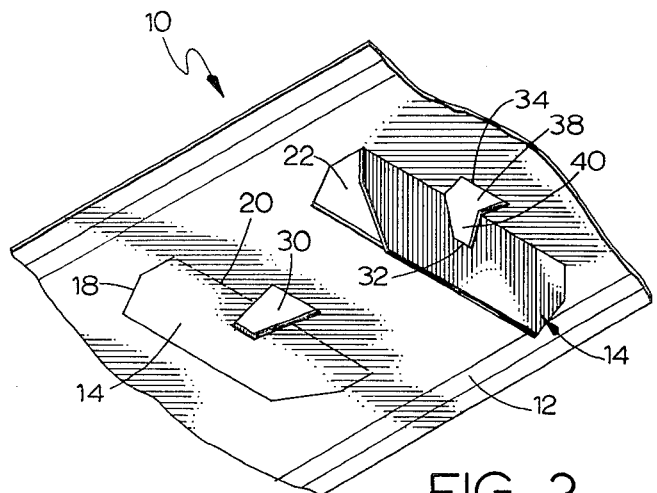
FIG. 2 is a perspective bottom view of the rail of FIG. 1.

A rail 10 for holding turning vanes has a base sheet or wall 12. Depending from an underside and integral with base sheet 12 is a plurality of vane guide plates or tabs 14. In the example illustrated, sheet 12 is made of sheet metal and vane guide plates 14 are cut from and bent away from sheet 12. In FIGS. 1 and 2 a vane guide plate 14 is outlined by slit lines 18. A vane guide plate 14 is formed by cutting along line 18 and then bending the plate 14 down along a bend line shown as a dotted line 20. Once plate 14 is bent away from sheet 12 an opening 22 is left in base sheet 12.

Rail 10 is provided with an opening or aperture 30, which is preferably trapezoidal. In the embodiment illustrated, the two parallel ends of the trapezoid, top or short end 32 and base or long end 34, are generally parallel to bend line 20, along which plate 14 is attached to sheet 12. Line 20 transversely bisects aperture 30 generally at the midpoint of slanted sides 36 and thus the aperture 30 spans the bend line 20. Therefore, after plate 14 is bend away from sheet 12, aperture 30 has two portions: an opening portion 38 which remains in sheet 12 and a notch portion 40 in plate 14.

Figure 3:
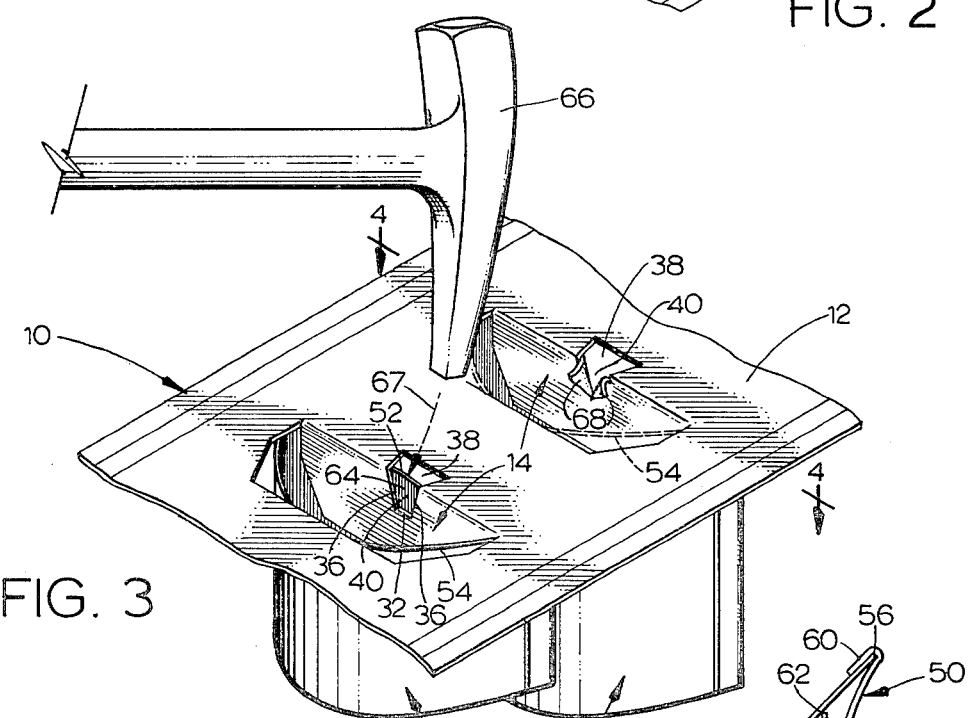
FIG. 3 is a perspective view of a rail and vane assembly.
Figure 4:
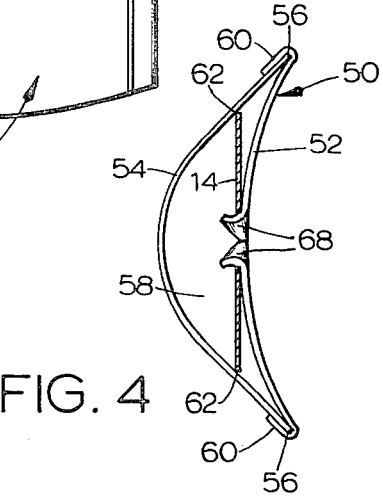
FIG. 4 is a cross sectional view taken on line 4—4 of FIG. 3.

The use of rail 10 is best shown in FIGS. 3 and 4. For installation, a turning vane 50 is stood on end. The turning vane 50 illustrated is formed by attaching two curved pieces of sheet metal, wall 52 and wall 54, together along their straight side edges 56. Wall 52 has a shallow curve, that is, a large radius of curvature. Wall 54 has a deeper curve, derived from a shorter radius of curvature. Therefore, when their edges touch at 56, a lunular hollow area 58 is formed between the walls. Edge lips 60 of wall 52 are bent around wall 54 and crimped to form turning vane 50.

Rail 10 is positioned above turning vane 50 so that plate 14 is generally parallel to a line between points 56. Rail 10 is then lowered so that plate 14 is forced into hollow area 58 in turning vane 50. Plate 14 is sized to contact wall 54 at points 62 and contact wall 52 near its midpoint. This three-point contact force-fits plate 14 within hollow area 58. As shown in FIG. 3, a portion 64 of wall 52 aligns with the notch portion 40 of aperture 30 which is on plate 14. To securely attach vane 50 to rail 10, this portion 64 of wall 52 is struck through the opening portion 38 with a tool 66, such as the tinner's hammer illustrated. The blow of hammer 66, along arrow 67, breaks away tabs 68 from wall 52 and bends them through notch portion 40 across the straight edge 32 and sides 36 of notch 40.

The shape of tab 68 varies with the material of which vane 50 is formed and the angle of the blow of hammer 66. In the preferred embodiment illustrated, a pair of generally triangular tabs is broken away. In other types of vane 50, where notch 40 is trapezoidal in shape, the tab 68 which is broken away has a trapezoidal shape. The narrow end of the trapezoidal tab 68 rests against short end 32 of the trapezoidal notch 40. The tab is folded over the end of the notch to the opposite side of the plate 14 from the wall 52. The widening taper of the trapezoidal tab 68 in those cases helps to prevent any loosening of the connection between the vane wall 52 and plate 14. The opening in base sheet 12 left when the vane guide plate 14 is bent downwardly also provides an opening for access to the notch portion 40 so the tab can be bent easily.

When constructed according to the present invention, a rail can be quickly and easily connected to hollow turning vanes to assemble any needed configuration. No special fasteners are needed. This not only saves money, but limits the number of necessary parts to be assembled. Special fasteners need not be stocked and available at the point of connection. No special tools are required for any assembly operation. A single blow from a tinner's hammer commonly used in the trade attaches the rail to the vane.

The assembly operation involves only positioning the vane guide plate 14 against a wall of a turning vane and striking the wall with one sharp blow to form tabs 68 and fold them over the edge 32 and sides 36. The invention can be practiced with vanes of various shapes and construction, as long as the material is suitable for forming tab 68 when struck by a tool. The result is a method of construction which is faster, easier, and cheaper than prior art methods. The rail 10 constructed according to the present invention can be inexpensively fabricated from a single sheet of sheet metal. Although the trapezoidal shape of the aperture 30 illustrated is preferred, many other shapes and configurations may be used in practicing the invention.

The vanes may each be only a single straight wall forming a baffle or may be curved, single walls, and of any cross sectional shape. Normally in vane assemblies there is a rail 10 at both ends of the vanes. The assembly of rails secures the vanes in parallel relationship until the assembly is inserted into a duct. The rails 10 are then normally fastened to the walls of the duct in which they are placed.

Although the present invention has been described with reference to preferred embodiments, workers skilled in the art will recognize that changes may be made in form and detail without departing from the spirit and scope of the invention.

What is claimed is:

1. A rail assembly for supporting a plurality of turning vanes for airflow, the rail assembly comprising:
    a base sheet having a longitudinal axis;
    a plurality of vane guide plates spaced along the longitudinal axis and formed by slitting each vane guide plate from the base sheet and bending each vane guide plate along a bend line to a position generally perpendicular to the base sheet, each vane guide plate leaving an opening in the base sheet which is spaced longitudinally on the sheet from the bend line of the next vane guide plate, the vane guide plates being adapted to be contacted by a wall of the vane to be supported; and
    the base sheet being provided with apertures formed through the base sheet, each aperture being partially in one vane guide plate and partially on the portion of the base sheet between the bend line and the next adjacent vane guide plate, each aperture spanning the bend line of its associated vane guide plate, and being spaced longitudinally from the opening left by the next adjacent vane guide plate to provide a wall section on the base sheet between the adjacent vane guide plates, each aperture being of a generally trapezoidal shape having end edges lying transverse to the longitudinal axis of the sheet, the longer edge of each trapezoidal aperture remaining on the sheet, and the narrower edge of each of the trapezoidal apertures being on the vane guide plate, each aperture extending from the bend line along its associated vane guide plate a desired distance, so that when a vane is supported with a vane wall against the vane guide plate a portion of the vane wall protrudes into the portion of the aperture formed on the vane guide plate immediately below the bend line, the wider portion of the trapezoidal aperture on the sheet providing an opening in which to move a striking tool to break a tab from the vane wall protruding into the portion of the aperture on the vane guide plate and bend the tab through the portion of the aperture in the vane guide plate to secure such vane to the vane guide plate, the trapezoidal shape providing a guide for the striking tool that is larger where the striking tool will pass through the plane of the base sheet.

2. The apparatus of claim 1 wherein the turning vanes are of the hollow type having an inside curved wall having a first radius of curvature and an outside curved wall having a second shorter radius of curvature, the two walls being connected at their straight edges so that the turning vane has a hollow central area with a lunular cross section; and each vane guide is shaped and sized to snugly fit in the hollow area of its respective turning vane, generally parallel to a point between the connected edges.

* * * * *